UNITED STATES PATENT OFFICE.

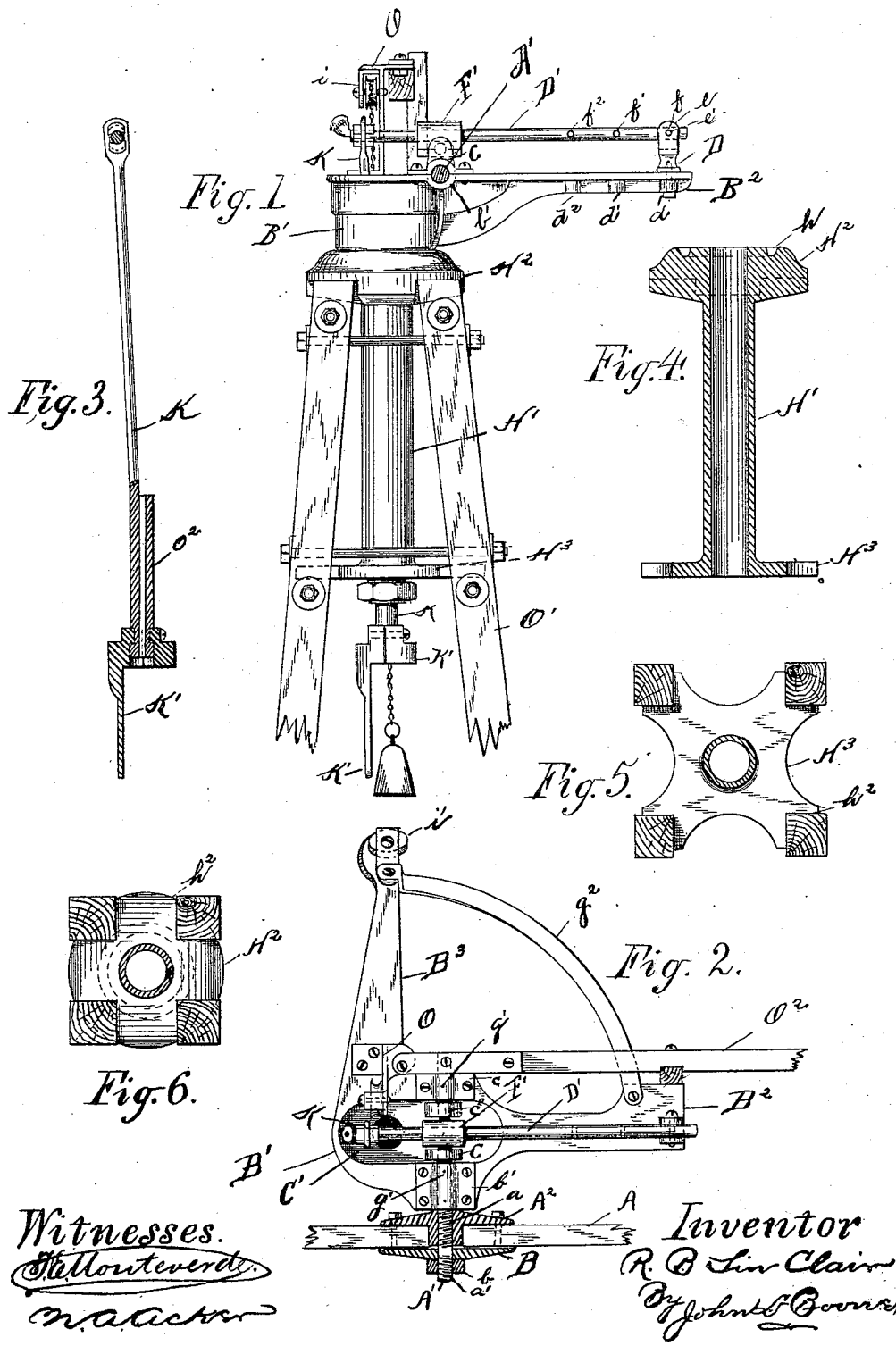

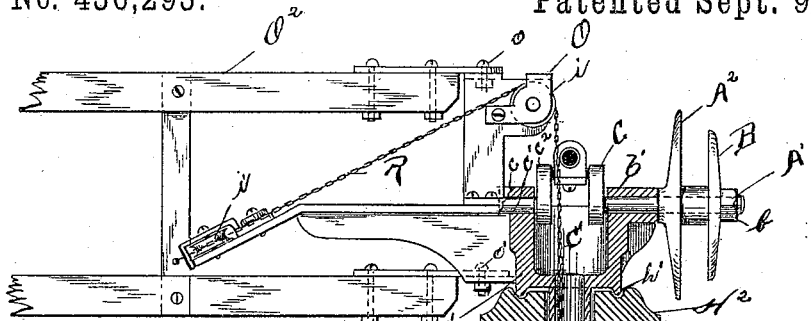
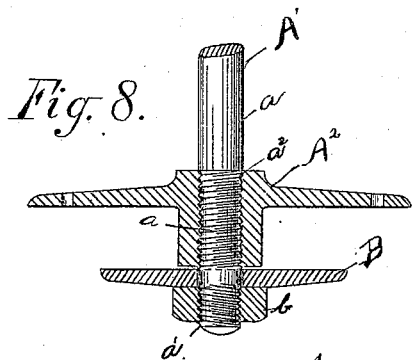
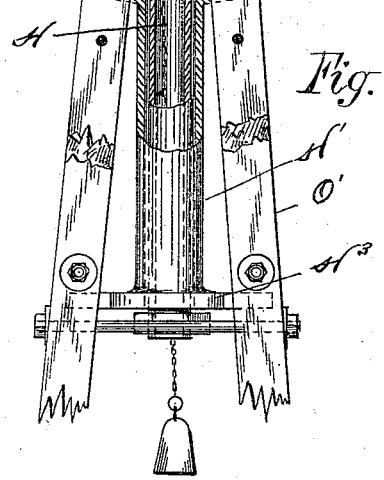
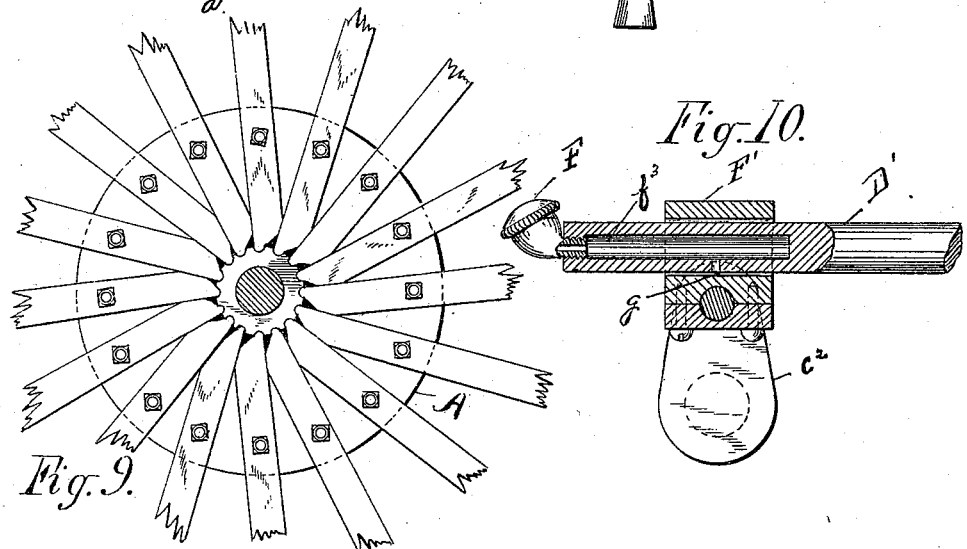

R. B. SINCLAIR, OF ALAMEDA, CALIFORNIA, ASSIGNOR, BY DIRECT AND MESNE ASSIGNMENTS, TO THE SINCLAIR MANUFACTURING COMPANY, OF CALIFORNIA.

WINDMILL.

SPECIFICATION forming part of Letters Patent No. 436,293, dated September 9, 1890.

Application filed November 19, 1889. Serial No. 330,880½. (No model.)

*To all whom it may concern:*

Be it known that I, R. B. SINCLAIR, a citizen of the United States, residing at Alameda, in the county of Alameda and State of California, have invented certain new and useful Improvements in Windmills; and I do hereby declare the following to be a full, clear, and exact description of said invention, such as will enable others skilled in the art to which it most nearly appertains to make, use, and practice the same.

My invention relates to certain new and useful improvements in windmills; and it consists of the parts and details of construction, as will be hereinafter more fully shown in the drawings, described, and pointed out in the specification.

Referring to the drawings forming a part of this specification, and in which similar letters of reference are used to denote corresponding parts throughout the entire specification and several views of the drawings, Figure 1 is a front elevation of my device, showing the fan removed; Fig. 2, a top plan view of the operating machinery; Fig. 3, a detail view of the plunger operating or connecting rod; Fig. 4, a vertical section of the tube, head or base plate, and brace-plate constituting the lower portion of the turn-table; Fig. 5, a detail view of the brace-plate; Fig. 6, a bottom view of the base-plate of the turn-table; Fig. 7, a side elevation, partly broken away, of the device, showing the fan removed; Fig. 8, a sectional detail view of the outer end of the rotary crank-shaft, showing the wing-plate of the fan and retaining washer and nut secured thereon; Fig. 9, a front view of the fan, partly broken away; and Fig. 10 an enlarged detail view, partly in section, showing the operating-piston, sliding box, and one of the crank-arms for operating the same.

In the drawings, the letter A is used to indicate the ordinary mill-fan secured to the shaft $A'$. The outer end of this shaft has formed thereon the right and left hand screw-threads $a$ $a'$, and the hub $a^2$ of the wing-retaining plate $A^2$ is provided with the threads corresponding with the ones $a$ formed upon the rotary shaft. By means of the retaining-plate $A^2$ and the collar or retaining-washer B the fan or wheel is held or secured upon the shaft $A'$, and the whole is held securely thereon by means of the nut $b$. The upper portion of the turn-table is represented by the letter $B'$, which is provided with the arms $B^2$ $B^3$. The shaft $A'$ is secured within the bearing $b'$, and the inner end thereof is provided with the crank-arm C. Secured within the bearing $c$, opposite the bearing $b'$, is the smaller shaft $c'$, which also has its inner end provided with the crank-arm $c^2$. The top of the turn-table is provided with the chamber $C'$, and within the chamber works the before-mentioned crank-arms, as hereinafter explained.

The arm $B^2$ of the turn-table is provided with a series of perforations $d$ $d'$ $d^2$, within the outer one of which is secured the standard D, which is bifurcated so as to form arms $e$, and between said arms is fulcrumed, by means of the bolt $e'$, the operating-lever $D'$, which is also provided with a series of perforations $f$ $f'$ $f^2$. The lever, as shown, is made hollow for a portion of its distance so as to form a chamber $f^3$, and its inner ends terminates in a screw-threaded cap F. This chamber forms an oil-receptacle. Upon this lever works the slide $F'$, which is operated through the medium of the crank-arms C $c^2$ by the rotation of the crank-shafts $A'$ $c'$, before mentioned. The bottom of the oil-receptacle $f^3$ is provided with the opening $g$, so as to allow the slide to be self-lubricating, and the bearings $c$ $b'$ have oil-openings $g'$ formed therein to permit lubrication of the rotary crank-shafts. The two arms of the turn-table are connected together at their ends by means of the brace $g^2$. At the inner extremity of the arm $B^3$, I secure the standard O, and to the top of this standard and the outer extremity of said arm I secure the pulleys $i$ $i'$, for the purpose hereinafter described.

As shown in Fig. 7 of the drawings, the tube H is secured to the bottom of the top portion of the table $B'$ and fits within the hollow rod $H'$, which connects the base $H^2$ of the turn-table and the brace-plate $H^3$ together, and said tube opens within the chamber $C'$, formed in the top of the table. The base $H^2$, hollowed rod $H'$, and brace-plate $H^3$, by preference I make integral, but they may, if so desired, be made separately and screwed or bolted together.

Within the tube H runs the connecting-rod K, which connects at its upper end with the operating-lever D'. The lower portion of said rod is enlarged and hollowed, as shown in Fig. 3 more fully, and is connected to the plunger-rod K' by being swiveled. By thus securing the connecting-rod to the plunger-rod the table may be permitted to turn in any direction according to the change of the wind without altering the position of said plunger.

In order to provide for the revolving of the table with as little friction as possible, I form the groove $h$ in the top of the base-plate $H^2$, which forms a seat for the depending portion of the table, which is illustrated by the letter $h'$. The base-plate $H^2$ and the brace-plate $H^3$ are cut away, as shown at $h^2$, so as to form a seat for the standards O' of the tower. Inasmuch as the base-plate and brace-plate are connected, a perfect adjustment is formed for the standards.

The letter $O^2$ indicates the vane of the mill, which is secured to the turn-table and upright O by means of the bolts or pins $o$ $o'$. Attached to the vane at any suitable portion is the chain R, the free end of which passes beneath the pulley $i'$, over pulley $i$, thence down through the tube H and the hollow enlarged portion $o^2$ of the connecting-rod K, as shown in the drawings. Said chain is continuous within a short distance of the ground, whence a weight is secured thereto. By releasing the weight from the chain R the force of the wind will cause the vane to be thrown out of position, thereby throwing the wheel out of wind and stopping the working of the mill. If so desired, however, the weight attached to the chain may be sufficiently light as to be lifted by the vane upon movement thereof during heavy winds, so as to automatically cause the wheel to be thrown out of operating position. By moving the bifurcated stand inward and securing the same within the perforation $a'$ or $a^2$, and the operating-lever between the arms of said standard at either $f'$ or $f^2$, it is obvious that inasmuch as the fulcrum of the lever is brought nearer to the connecting-rod greater or longer will be the stroke given to the plunger-rod through the medium of the operating-rod; accordingly the stroke may be increased or decreased, as desired, without affecting the working of the mill.

From the foregoing it will be seen that when rotation is imparted to the shaft A', through the action of the wind upon the fan proper, the crank-arm C upon the inner end of said shaft will act upon the slide F' and cause the said shaft to move upon the operating-lever D'. As the shaft A' is thus continuously rotated, it is also necessary that the crank-arm should rotate in unison therewith. Inasmuch as the upper end of said crank, however, is pivoted to the slide, the latter, when moving upon the operating-rod, necessarily causes the rear end of said rod to be given an up-and-down movement within the chamber C' in the top of the turn-table, thus allowing the complete rotation of the crank. Of course the crank $c^2$ upon the opposite short shaft $c'$ also partakes of the same movement of the crank-arm C. The action of these two cranks being such, through the medium of the slides, as to cause the up-and-down motion of the operating-lever, of course a vertically-reciprocating motion is imparted to the connecting-rod and plunger.

I am aware that many minor changes may be made in the construction herein shown and described without causing a departure from the nature and scope of my invention.

Having thus fully described my invention, what I claim as new, and desire to secure protection in by Letters Patent of the United States, is—

1. In a windmill, the combination, with a turn-table provided with an elongated recess or opening in its head, and also having a laterally-projecting arm, said arm provided on its outer end with a standard, of an operating-lever having its outer end pivoted in the standard, a slide provided with a longitudinal aperture, through which said operating-lever passes, a shaft journaled in bearings in the turn-table at right angles to the operating-lever and carrying upon its outer end the wheel and provided on its inner end with a crank or wrist pin connected to the slide, a short shaft upon the opposite side of the slide journaled in suitable bearings on the turn-table and provided on its inner end with a crank secured to the slide, said crank and slide working in the recess or opening in the turn-table, and a plunger or pump rod connected to the inner end of the operating-lever, substantially as set forth.

2. In a windmill, in combination with a turn-table, a wheel-shaft mounted in suitable bearings thereon, said shaft being provided on its inner end with right and left screw-threads, a wing-retaining plate upon the shaft provided with threads corresponding to the inner threads of the shaft, and also having an outwardly-extending hub, a washer bearing against said hub, a nut having threads corresponding to the outer threads of the shaft and adapted to bear against the collar or washer, and wings inserted between the wing-retaining plate and said collar or washer, substantially as set forth.

3. In a windmill, the combination, with a turn-table having a recess or opening in its head and a tubular rod depending therefrom, and also having arms projecting at right angles, one of said arms provided with a downwardly-inclined extension, of a standard secured to the inner end of the latter arm, a pulley journaled in the downwardly-extending portion thereof, a pulley mounted in the upper end of the inner standard, a vane consisting of a series of horizontal strips connected by a vertical brace, the upper one of said horizontal strips being pivoted to the inner standard and the lower one to the turn-table, a curved brace connecting the arms of the turn-table, a chain secured to the vertical base of the vane, said chain passing beneath the lower pulley and above the upper one and then downwardly through the tubular rod, and a weight secured to the end of said chain, substantially as set forth.

4. In a windmill, the combination, with a turn-table provided upon its under side with an annular depending flange, of a tubular rod having its upper and lower ends provided with enlargements integral therewith, said upper end or head having an annular recess to receive the angular flange of the turn-table and forming a base for the same, inclined tower-standards fitting in angular notches in the lower enlargement of the tubular rod and their upper ends seated in peripheral notches in the upper end or head, and bolts for securing the standards rigidly in place, substantially as set forth.

In testimony whereof I affix my signature in presence of two witnesses.

R. B. SINCLAIR.

Witnesses:
   Tom Brown,
   N. A. Acker.